US011926163B2

(12) United States Patent
Gong

(10) Patent No.: US 11,926,163 B2
(45) Date of Patent: Mar. 12, 2024

(54) PRINTING CONSUMABLE AND INK CARTRIDGE

(71) Applicant: GEEHY MICROELECTRONICS INC., Zhuhai (CN)

(72) Inventor: Ming Gong, Zhuhai (CN)

(73) Assignee: GEEHY MICROELECTRONICS INC., Zhuhai (CN)

( * ) Notice: Subject to any disclaimer, the term of this patent is extended or adjusted under 35 U.S.C. 154(b) by 358 days.

(21) Appl. No.: 17/380,452

(22) Filed: Jul. 20, 2021

(65) Prior Publication Data

US 2021/0354474 A1 Nov. 18, 2021

Related U.S. Application Data

(63) Continuation of application No. PCT/CN2020/087582, filed on Apr. 28, 2020.

(30) Foreign Application Priority Data

May 6, 2019 (CN) ........................ 201910374757.X
Sep. 3, 2019 (CN) ......................... 201910828140.0

(51) Int. Cl.
*B41J 2/175* (2006.01)
*B41J 2/045* (2006.01)

(52) U.S. Cl.
CPC ....... *B41J 2/17546* (2013.01); *B41J 2/04501* (2013.01); *B41J 2202/13* (2013.01)

(58) Field of Classification Search
CPC ... B41J 2/17503; B41J 2/1752; B41J 2202/13
See application file for complete search history.

(56) References Cited

U.S. PATENT DOCUMENTS

2003/0218651 A1 11/2003 Hiroaki et al.
2008/0170093 A1 7/2008 Walmsley et al.
(Continued)

FOREIGN PATENT DOCUMENTS

CN 101894285 A 11/2010
CN 101954791 A 1/2011
(Continued)

OTHER PUBLICATIONS

The World Intellectual Property Organization (WIPO) International Search Report for PCT/CN2020/087582 dated Aug. 3, 2020 6 Pages (including translation).

*Primary Examiner* — Julian D Huffman
(74) *Attorney, Agent, or Firm* — ANOVA LAW GROUP, PLLC

(57) ABSTRACT

A printing consumable and an ink cartridge are provided in various embodiments of the present disclosure. The printing consumable includes an ink container, detachably installed on an ink cartridge main body; and further includes a first memory, disposed on the ink container, where the first memory is capable of being accessed by a printer and stores ink amount data related to an ink status in the ink container. The printer is configured to rewrite the ink amount data during an ink consumption process, where when ink is substantially used up, the printer is configured to rewrite a part of the ink amount data; and the rewritten part of the ink amount data is configured to be at a non-rewritable protected state.

13 Claims, 3 Drawing Sheets

(56) References Cited

U.S. PATENT DOCUMENTS

| | | | |
|---|---|---|---|
| 2011/0292102 | A1 | 12/2011 | Asauchi |
| 2018/0059615 | A1 | 3/2018 | Wei |
| 2019/0381802 | A1* | 12/2019 | Ng ....................... B41J 2/04521 |

FOREIGN PATENT DOCUMENTS

| | | | |
|---|---|---|---|
| CN | 102049903 | A | 5/2011 |
| CN | 102529401 | A | 7/2012 |
| CN | 102692858 | A | 9/2012 |
| CN | 102765256 | A | 11/2012 |
| CN | 103072380 | A | 5/2013 |
| CN | 106364168 | A | 2/2017 |
| CN | 106985540 | A | 7/2017 |
| CN | 107199782 | U | 9/2017 |
| CN | 110406264 | A | 11/2019 |
| EP | 1595711 | A1 | 11/2005 |
| EP | 1988429 | A2 | 11/2008 |
| EP | 3904104 | A1 | 11/2021 |
| JP | H03136863 | A | 6/1991 |
| JP | 2000198220 | A | 7/2000 |
| JP | 2001187455 | A | 7/2001 |
| WO | 2004071778 | A1 | 8/2004 |

* cited by examiner

PRINTING CONSUMABLE AND INK CARTRIDGE

CROSS-REFERENCE TO RELATED APPLICATIONS

This application is a continuation application of PCT Patent Application No. PCT/CN2020/087582, filed on Apr. 28, 2020, which claims the priority of Chinese patent application No. 201910374757.X, filed on May 6, 2019; and No. 201910828140.0, filed on Sep. 3, 2019, the entirety of all of which is incorporated herein by their reference.

TECHNICAL FIELD

The present disclosure generally relates to the field of printing and image forming technology and, more particularly, relates to a printing consumable and an ink cartridge.

BACKGROUND

A nozzle circuit, an ink container and an ink cartridge main body of a nozzle ink cartridge may be formed into a single-piece structure; and the nozzle circuit may be damaged if the single-piece structure is forcibly disassembled. When the ink in the ink container is used up, even if the nozzle circuit is undamaged, the nozzle ink cartridge may not continue to be used, which may cause waste of resources. In response to such problem, in the exiting technology, the ink container is configured as a detachable structure, such that when the ink in the ink container is used up, the ink container may be replaced.

However, with the above-mentioned method, users only know the ink container needs to be replaced when the ink in the ink container is used up and printing cannot be performed, and then replace the ink container. Before the replacement, a printer may still transmit a heating signal to the nozzle ink cartridge, causing a heating resistor in the nozzle circuit to generate heat; however, there is no ink around the heating resistor at this point, which may result in the damage to the nozzle circuit.

SUMMARY

One aspect of the present disclosure provides a printing consumable. The printing consumable includes an ink container, detachably installed on an ink cartridge main body; and further includes a first memory, disposed on the ink container, where the first memory is capable of being accessed by a printer and stores ink amount data related to an ink status in the ink container. The printer is configured to rewrite the ink amount data during an ink consumption process, where when ink is used up or nearly used up, the printer is configured to rewrite a part of the ink amount data; and the rewritten part of the ink amount data is configured to be at a non-rewritable protected state.

Another aspect of the present disclosure provides an ink cartridge. The ink cartridge includes an ink cartridge main body and a printing consumable. The printing consumable includes an ink container, detachably installed on an ink cartridge main body; and further includes a first memory, disposed on the ink container, where the first memory is capable of being accessed by a printer and stores ink amount data related to an ink status in the ink container. The printer is configured to rewrite the ink amount data during an ink consumption process, where when ink is used up or nearly used up, the printer is configured to rewrite a part of the ink amount data; and the rewritten part of the ink amount data is configured to be at a non-rewritable protected state. The ink container of the printing consumable is disposed on the ink cartridge main body.

Other aspects of the present disclosure can be understood by those skilled in the art in light of the description, the claims, and the drawings of the present disclosure.

Compared with the existing technology, the printing consumable, the ink cartridge, and the control method provided by various embodiments of the present application may control the printer to stop printing timely when the ink in the ink container is used up, which may avoid the damage problem of the nozzle circuit caused by continuously controlling, by the printer, the heating resistor in the nozzle circuit to generate heat when the ink is used up. Furthermore, the present solution may also indicate the ink consumption in the ink container, improve data transmission accuracy, and avoid the problem of wasting data resources.

BRIEF DESCRIPTION OF THE DRAWINGS

In order to clearly illustrate the technical solutions in various embodiments of the present disclosure, the drawings, which are required to be configured in the description of disclosed embodiments, are briefly described hereinafter. It should be understood that the following drawings are merely some embodiments of the present disclosure and are not to be considered as the scope limitation. Other drawings derived from such drawings may be obtained by those skilled in the art without creative work.

DETAILED DESCRIPTION

Figure 1:
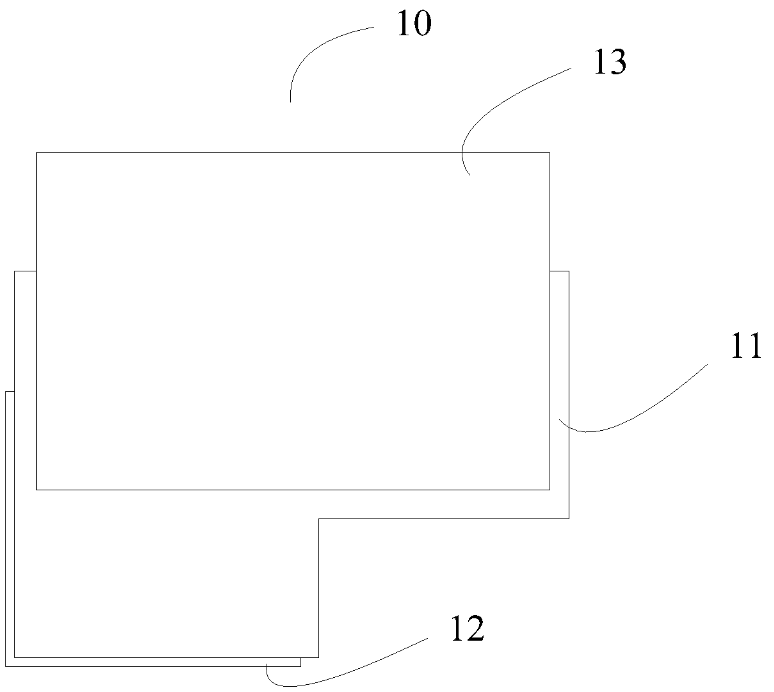
FIG. 1 illustrates a structural schematic of an ink cartridge according to various exemplary embodiments of the present disclosure.

In order to illustrate objectives, technical solutions and advantages of various embodiments of the present disclosure more clearly, the technical solutions in various embodiments of the present disclosure may be clearly and completely described with reference to the drawings in various embodiments of the present disclosure hereinafter. Obviously, described embodiments may be a part of various embodiments, rather than all of various embodiments, of the present disclosure. The components of various embodiments of the present application described and shown in the drawings herein may be arranged and designed in various different configurations.

Therefore, the following detailed description of various embodiments of the present application provided in the drawings may not be intended to limit the scope of the claimed invention, but may merely represent selected embodiments of the present application. Based on various embodiments in the present application, all other embodiments obtained by those skilled in the art without creative work shall fall within the protection scope of the present application.

It should be noted that similar reference numerals and letters may indicate similar items in the following drawings. Therefore, once a certain item is defined in one drawing, it may not need to be further defined and explained in the subsequent drawings.

FIG. 1 illustrates a structural schematic of an ink cartridge according to various exemplary embodiments of the present disclosure. An ink cartridge 10 may include an ink cartridge main body 11, a nozzle circuit 12, and an ink container 13 (also referred to as an ink sac). The ink container 13 may be removably or detachably disposed in the containing structure of the ink cartridge main body 11 for containing ink. The nozzle circuit 12 may be attached to the ink cartridge main body 11, and a fluid path structure used as an inkjet path may be between the nozzle circuit 12 and the ink cartridge main body 11. In such way, the ink in the ink container 13 may reach the nozzle circuit 12 along the fluid path structure, and the nozzle circuit 12 may regularly execute the inkjet action under the control of a printer.

The ink in the ink container 13 may gradually decrease till being substantially used up as printing progresses. In order to enable that the ink consumption in a new ink container may be recorded and fed back after the ink container is replaced and the printer may be controlled to stop printing timely when the ink in the ink container is substantially used up, a new printing consumable is provided in various embodiments of the present disclosure. The printing consumable may include the ink container 13 and a first memory disposed on the ink container 13; and the first memory may be electrically connected to the nozzle circuit on the ink cartridge main body. It should be noted that the first memory may be replaced with the replacement of the ink container 13. When the ink cartridge 10 is installed on the printer, the first memory may be accessed by the printer.

In various embodiments of the present disclosure, the first memory disposed on the ink container may store a plurality of parameters. Exemplarily, the storage parameters may include ink amount data related to the ink status in the ink container, for example, ink remaining amount data which can be used to characterize remaining ink amount, ink usage data which can be used to characterize ink amount which has been used, insufficient ink indication data which can be used to characterize that the ink has been used up or is nearly used up, or the like. It should be understood that all data related to ink consumption and status may be the ink amount data mentioned in one embodiment. Such ink amount data may be normally overwritten by the printer during the ink consumption process.

In some embodiments of the present disclosure, a part of the ink amount data stored in the above-mentioned memory may be configured to be at a protected state which cannot be rewritten by the printer. Specifically, the ink amount data which is overwritten by the printer when the ink is used up or nearly used up may be configured to be at the protected state. In such way, when such part of the ink amount data cannot be overwritten successfully by the printer, it is regarded as that a program error or component failure may occur, thereby stop the printing operation.

Figure 2:
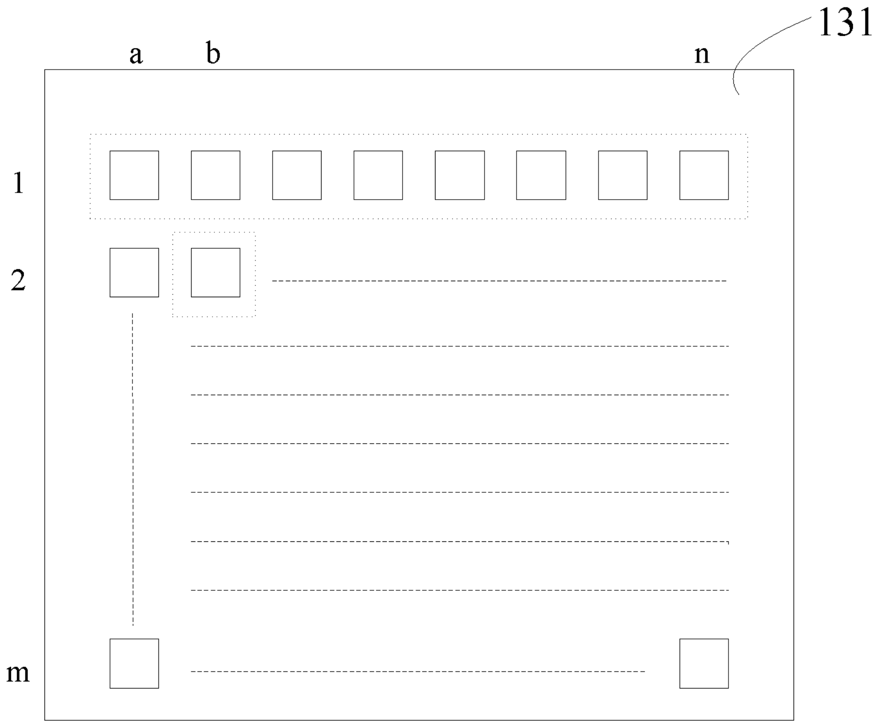
FIG. 2 illustrates a schematic of data bits of a first memory according to various exemplary embodiments of the present disclosure.

Exemplarily, the first memory may include a plurality of data bits, also called a plurality of data addresses. FIG. 2 illustrates a schematic of data bits of the first memory 131 according to various exemplary embodiments of the present disclosure. The first memory 131 may include m×n data bits arranged in rows (e.g., from row 1 to row m) and columns (e.g., from column a to column n).

In practical applications, when the printer performs read and write access on the first memory 131, it may first determine a corresponding data bit from the m×n data bits through an address signal and then use a read signal and a write signal to read and write the data on the determined data bit. Exemplarily, the read signal transmitted by the printer may be a current signal, and the write signal transmitted by the printer may be a voltage signal. In various embodiments of the present application, when the ink cartridge 10 is installed on the printer, the printer may estimate ink consumption amount in a currently installed ink container 13 of the ink cartridge 10 according to a preset consumption rate, and then estimate remaining ink amount in the ink container 13; and according to the estimated remaining ink amount, the remaining ink amount information of the ink amount data bits in the first memory 131 of the ink container 13 may be updated. In other embodiments, the ink status information may also be obtained through detection components of the ink cartridge, the printer, or the like.

Referring to FIG. 2, FIG. 2 exemplarily illustrates 8 ink amount data bits 1*a*-1*n* of the first memory 131 for storing the ink remaining amount data.

When the ink container 13 is initially installed on the ink cartridge main body 11, the data on the 8 ink amount data bits 1*a*-1*n* are all "0", indicating that the ink remaining amount is 100%. Correspondingly, when the ink cartridge 10 is initially installed on the printer, the printer may determine that current ink remaining amount of the ink cartridge 10 is 100% according to the data read from the ink amount data bits of the first memory 131.

With the use of the ink cartridge 10, the ink amount in the installed ink container 13 decreases, and the printer may be configured to rewrite the ink amount data during the ink consumption process. For example, the printer may estimate the ink remaining amount in the ink container 13 according to a preset consumption rate, and rewrite the data of the above-mentioned 8 ink amount data bits one by one according to estimation result, for example, rewrite the data to "1"; and when the ink is used up or nearly used up, the printer may rewrite the data of the last ink amount data bit, indicating that the ink in the ink container 13 is used up.

In various embodiments of the present application, the ink remaining amount data at a last bit may be configured to be at the protected state/non-rewritable state. When the printer determines that the ink is used up or nearly used up, the printer may rewrite last ink remaining amount data; however, after performing the rewriting operation, it may find that the rewriting operation is not successful, and an error may be reported, thereby stopping the printing operation.

In some other embodiments, the first memory may also store insufficient ink amount identification data. When the printer reads that the ink remaining amount data of the first memory 131 reaches a preset value indicating that the ink is used up, the printer may write the insufficient ink amount identification data as a specific value (e.g., logic value 1), to indicate that the ink amount in the ink container 13 is insufficient.

In order to enable the printer to automatically stop printing when the ink in the ink container 13 currently installed on the ink cartridge 10 is used up, in various embodiments of the present application, the insufficient ink amount identification data of the first memory 131 may be configured to be at the protected state, such that the printer may not be able to rewrite the insufficient ink amount identification data.

Through the above-mentioned design, when the printer reads that the ink remaining amount data of the first memory 131 reaches the preset value, determines that the ink is in a used-up or nearly-used-up state, and attempts to rewrite the insufficient ink amount identification data of the first memory 131, the writing operation may not be successful, such that the printer may report an error and stop printing according to its own mechanism. In such way, the objective that the printer automatically stops printing when the ink of the ink cartridge 10 is used up may be realized. It should be noted that the ink amount data including the ink remaining amount data and the insufficient ink amount identification data and the like may be stored in a plurality of discrete data bits, and the printer may update/rewrite the ink remaining amount data according to its preset rules. In other embodiments, the effective logical value may also be other numerical values. For example, the logical value "0" may also be used to indicate a used-up state.

Figure 3:
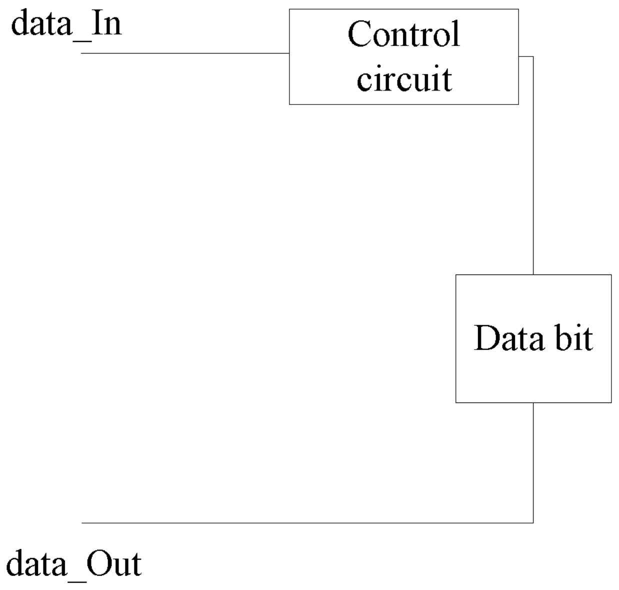
FIG. 3 illustrates a schematic of signal lines of data bits according to various exemplary embodiments of the present disclosure.

Exemplarily, referring to FIG. 3, in one embodiment, the data bits may be configured with a read signal line data_Out and a write signal line data_In for the communication with the printer. A write signal transmitted by the printer may be transferred from the write signal line data_In to a corresponding data bit, and a read signal may be transferred from the read signal line data_Out to the printer.

In various embodiments of the present application, a control circuit may be configured for the write signal line of data bits of a part of the data, thereby setting the protected state of such part of the data. Exemplarily, the control circuit may be configured between the write signal line and a part of the data bits, as shown in FIG. 3. The control circuit may realize the non-rewritable state of the stored data of the data bits.

Exemplarily, the control circuit may be configured to interfere with the write signal, transmitted by the printer, to the data bit at the protected state. For example, the control circuit may change the write signal to another signal that cannot be implemented by the data bit and/or may block the write signal transmitted to the data bit, such that the write signal cannot reach a specified data bit, and the data on such data bit may not be rewritten successfully. In various embodiments, although the data bit cannot be rewritten, the data bit may still be read.

Figure 4:
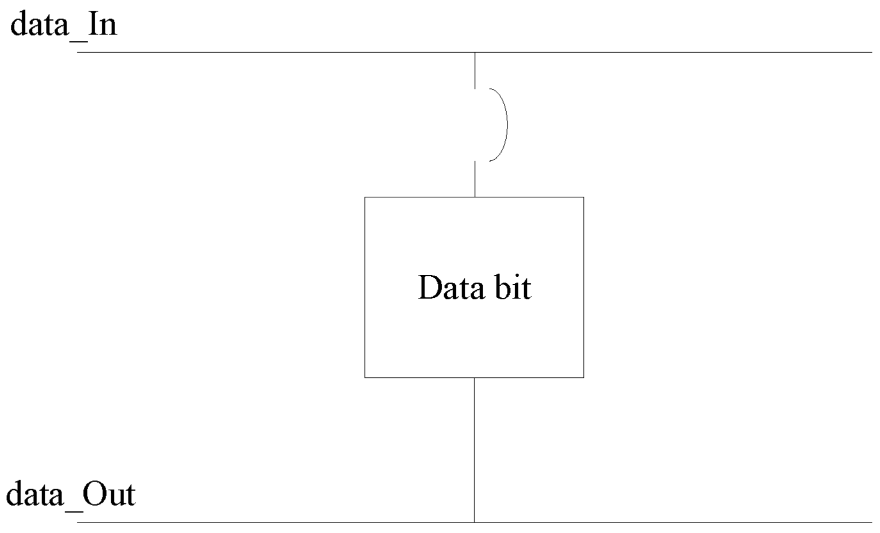
FIG. 4 illustrates another schematic of signal lines of data bits according to various exemplary embodiments of the present disclosure.

Exemplarily, the control circuit may include a switch, as shown in FIG. 4. The switch may be configured to be in a cutoff state when the printer transmits a write signal. The switch may be a semiconductor device such as a triode, a thyristor, or the like. In other embodiments, the write signal line of such part of the data bits (e.g., insufficient ink identification data) may be configured to be in a disconnected state. For example, in one embodiment where the protected state is configured for the insufficient ink amount identification data of the first memory 131, the insufficient ink amount identification bit may only store preset original data, and cannot be rewritten by the printer. In other words, when the printer attempts to write the data, indicating insufficient ink amount, to the insufficient ink amount identification bit, the writing operation may fail.

Exemplarily, in one embodiment, when the logical value "1" is configured as a valid value, the value of the insufficient ink amount identification bit (i.e., an initial value) may be 0.

Exemplarily, the control circuit may be configured to be capable of invalidating the write signal transmitted from the printer. For example, in one embodiment where a high-voltage write signal is a valid signal, the control circuit may pull a received data rewrite signal down to a low-voltage signal, such that when such low-voltage signal reaches the data bit, the data may not be successfully rewritten. Exemplarily, the control circuit may include an inverter circuit, such as an inverter and the like. The invalid write signal cannot rewrite such data. Exemplarily, the control circuit may further include a gated resistor, configured to pull down the data rewrite signal when receiving the data rewrite signal.

When the printer does not receive a feedback signal of successful writing after executing writing operation on the data configured to be at the protected state, or when the printer reads the data after executing the writing operation and determines the data to still be the original data, or when a plurality of writing operations are performed and the number of writing operations reaches a preset value, the printer may report an error and stop printing.

It should be noted that the control circuit in the above-mentioned embodiments may be configured between the write signal line and the part of the data bits, and may be a sub-write signal line connected to internal data bits of the memory, and also be an overall write signal line outside the memory. Any manners where a part of the data cannot be rewritten by configuring the control circuit should fall into the protection scope of the present application.

In one embodiment, ink cartridge information data may be divided into two parts: fixed-type ink cartridge data and consumption-type ink cartridge data, where the consumption-type ink cartridge data may be ink cartridge data which changes with the replacement of the ink container or the ink consumption, for example, the above-mentioned ink remaining amount, a number of printable pages, a region code, a serial number, and the like.

The number of printable pages normally refers to a number of pages which can be printed by the ink amount contained in the ink container. The printer may read the number of printable pages as a base for estimating the ink consumption amount and remaining amount of the ink container.

The serial number is a unique array of a consumable. The printer may normally record its serial number after the consumable is installed and perform exclusive identification based on recorded serial numbers. In other words, after replacing the ink cartridge, if a consumable with a same serial number is found, the printer may selectively report an error to prevent the consumable with the same serial number from being used. It should be noted that, in one embodiment, the data, similar to the serial number which is only permitted when it is used for the first time, may also be regarded as the consumption-type ink cartridge data described in one embodiment.

The region code indicates the region where the consumable is allowed to be used. In the process of consumable recycling, it is normally necessary to replace the region code of the consumable according to market demand. It should be understood that, in addition to the number of printable pages, the serial number and the region code which are listed above, other data, which is rewritten as the ink of the ink container 13 is consumed, or is rewritten due to the replacement of the ink container 13, or is exclusively prohibited due to the first use, may be regarded as the above-mentioned consumption-type ink cartridge data.

In one embodiment, in addition to the above-mentioned ink amount data, the first memory 131 may also store and include other data. The other data may include, for example, at least one of the above-mentioned number of printable pages, the region code, and the serial number.

The fixed-type ink cartridge data may be ink cartridge data which does not change with the replacement of the ink container or does not change with the ink consumption, for example, a ROM code, an analog magnification, a verification value, and the like.

The ROM code may be configured to characterize a specific encryption manner. The printer may decipher the encryption manner used by the data in the memory by reading the ROM code, thereby decrypting encrypted data in the memory based on a decryption manner corresponding to the encryption manner.

The analog magnification may include a plurality of data sets. The plurality of data sets may be normally written when the printing consumables are shipped, and the printer may adjust printing electrical parameters according to the analog magnification. The verification value may be an electrical parameter of an analog resistance specified by the nozzle circuit 12, or may be an analog value calculated by a specified algorithm. The printer may measure/calculate the analog value after installing the printing consumables, and may compare and identify the measured/calculated result with a pre-stored verification value.

It should be understood that, in addition to the ROM code, the analog magnification, and the verification value which are mentioned above, any other data which does not change with the consumption of printing consumables (e.g., ink in the ink container) may be regarded as the fixed-type ink cartridge data.

Correspondingly, the above-mentioned fixed-type ink cartridge data may be stored in a circuit on a side of the ink cartridge main body 11 without being replaced. For example, the ink cartridge 10 may also include a second memory disposed on the ink cartridge main body 11, where the second memory may be electrically connected to the first memory; and the first memory and the second memory may be accessed by the printer simultaneously. The second memory may have a plurality of same data bits corresponding to the first memory 131, which, for another example, may be stored in the nozzle circuit 12.

In one implementation manner, when the ink container 13 is installed on the ink cartridge main body 11, the first memory 131 may be electrically connected to the printer through an interface circuit of the second memory. The first memory 131 and the second memory may together receive and feed back the read and write signals transmitted by the printer.

In another implementation manner, the control circuit may be configured to enable the first memory 131 and the second memory to communicate with the printer respectively. In such way, when the printer reads and writes the consumption-type ink cartridge data, the read and write signals transmitted by the printer may be transmitted to the first memory; and when the printer reads and writes the fixed-type ink cartridge data, its read and write signals (mainly, the read signal) may be transmitted to the second memory. The first memory and the second memory may independently perform corresponding feedback according to the signals transmitted by the printer. In such case, the second memory may store at least one type of the fixed-type ink cartridge data, such as at least one of the ROM code, the analog magnification, and the verification value which are mentioned above. At least one portion of data (e.g., fixed-type ink cartridge data) stored in the second memory may be different from any data stored in the first memory.

In some embodiments, the ink cartridge main body 11 may also have an original memory (a third memory), which is exemplarily configured in the nozzle circuit. The original memory may originally store the fixed-type ink cartridge data and the consumption-type ink cartridge data which is rewritten into a used-up state due to total ink consumption.

At this point, the first memory and the second memory may be configured to be electrically connected to the printer, the first memory may store the consumption-type ink cartridge data, and the second memory may store the fixed-type ink cartridge data. Meanwhile the electrical connection between the third storage and the printer may be disconnected to prevent the third storage from interfering with data transmission. The nozzle circuit may include a third memory for simultaneously receiving and responding to command signals from the printer.

In other embodiments, the first memory may be configured to store repair data for the third memory. The original memory may store original ink cartridge data of the ink cartridge 10, that is, the ink cartridge data before the ink container 13 is replaced for the first time, and a part of the consumption-type data may be written as a used-up state. The consumption-type ink cartridge data stored in the first memory may be configured to repair used-up state data in the ink cartridge data stored in the original memory. Exemplarily, a plurality of data bits of the third memory may correspond to the plurality of data bits of the first memory in a one-to-one relationship; the third memory may be electrically connected to the first memory; and the third memory and the first memory may simultaneously receive and respond to command signals from the printer. Repair values stored in the first memory may be superimposed on the used-up data of the third memory in a one-to-one correspondence, and the used-up data required by the printer may be outputted. During the ink consumption process, the printer may still rewrite the consumption-type data of the two memories simultaneously.

Through the above-mentioned design, the consumption-type ink cartridge data may be replaced, while the fixed-type ink cartridge data may not need to be changed or rewritten. On the one hand, data resources may be saved. On the other hand, when the ink is used up, only the ink container and the first memory need to be replaced, while components such as the ink cartridge main body, the nozzle circuit and the like may continue to be used, which may make the printing consumable recycling more convenient.

Figure 5:
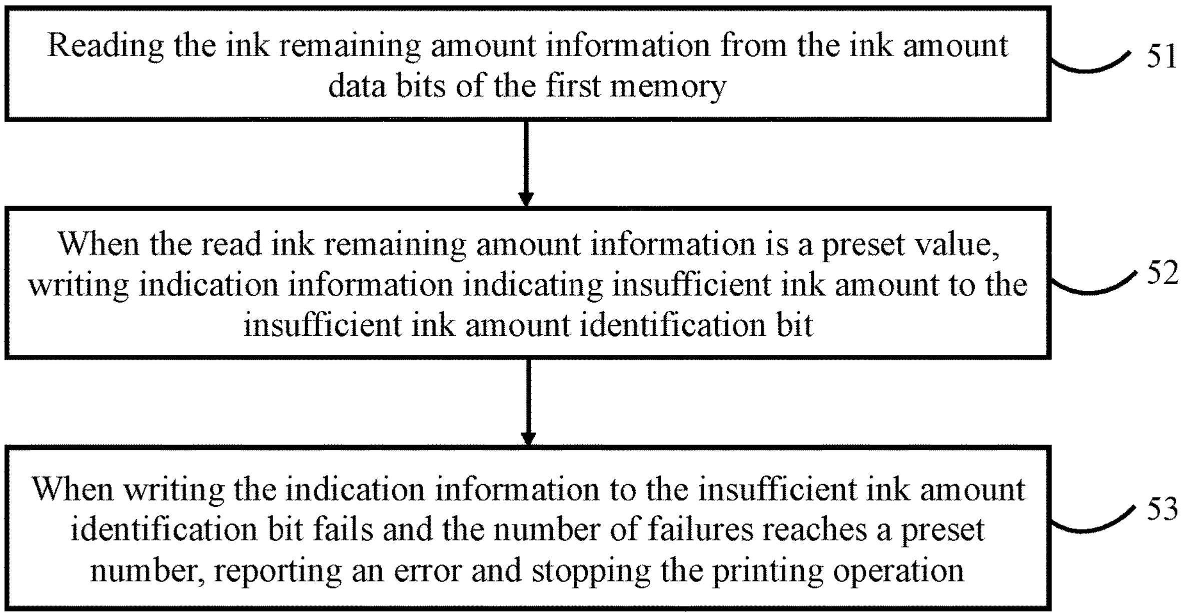
FIG. 5 illustrates a flow chart of a control method according to various exemplary embodiments of the present disclosure.

Referring to FIG. 5, various embodiments of the present application also provide a control method, which may be applied to the printer installed with the printing consumables provided in various embodiments. The steps included in the method are exemplarily described in the following hereinafter.

In step 51, the ink remaining amount information may be read from the ink amount data bits of the first memory.

In step 52, when the read ink remaining amount information is a preset value, indication information indicating insufficient ink amount may be written to the insufficient ink amount identification bit, where the preset value may indicate that the ink in the ink container is used up. For example, in the above-mentioned embodiment, when the data of 8 ink amount data bits are all 1, it may indicate that the ink in the ink container is used up.

In step 53, when writing the indication information to the insufficient ink amount identification bit fails and the number of failures reaches a preset number, an error may be reported, and the printing operation may be stopped.

The preset number may be configured according to actual needs, for example, it can be 1-5 times, such as 3 times, which may not be limited according to various embodiments of the present disclosure.

In one embodiment, as described above, the remaining ink amount information in the ink amount data bit of the first memory may be the remaining ink amount in the ink container estimated by the printer according to a preset consumption rate, and may be written based on the estimated remaining ink amount.

It should be understood that the part of the data configured to be at the protected state may also include other data, and any data rewritten by the printer when the ink is used up or nearly used up may be the protected state data which is referred to in the present disclosure.

The printing consumable, the ink cartridge, and the control method provided by various embodiments of the present application may control the printer to stop printing timely when the ink in the ink container is used up, which may avoid the damage problem of the nozzle circuit caused by continuously controlling, by the printer, the heating resistor in the nozzle circuit to generate heat when the ink is used up.

In the description of the present application, it should be noted that the terms for indicating orientation or positional relationship, such as "center", "upper", "lower", "left", "right", "vertical", "horizontal", "inner", "outer" and the like, may be based on the orientation or positional relationship shown in the drawings, or the orientation or positional relationship that the products of the present disclosure are normally placed in use, which may only for the convenience of describing the present application and simplifying the description, rather than indicating or implying that the referring device or element must have a specific orientation to be constructed and operated in a specific orientation. Therefore, it may not be understood as a restriction on the present application.

In the description of the present application, it should also be noted that the terms "install", "connected", and "connection" are to be understood broadly unless otherwise specifically stated and defined; for example, it may be a fixed connection, a detachable connection, or an integrated connection; it may be a mechanical connection or an electrical connection; and it may be a direct connection or indirect connection through an intermediate medium and may be an internal connection between the two elements. The specific meanings of the above-mentioned terms in the present application may be understood in the specific circumstances for those skilled in the art.

The above may merely be specific implementation manners of the present application, but the protection scope of the present application may not be limited to these implementation manners. Those skilled in the art may easily think of changes or substitutions within the technical scope disclosed in the present application, and such changes or substitutions should be covered by the protection scope of the present application. Therefore, the protection scope of the present application shall be subject to the protection scope of the claims.

What is claimed is:

1. A printing consumable, comprising:

an ink container, detachably installed on an ink cartridge main body;

a first memory, disposed on the ink container, wherein the first memory is capable of being accessed by a printer and stores ink amount data related to an ink status in the ink container; and a control circuit, disposed between the printer and the first memory to interfere with transfer of a write signal from the printer to the first memory, wherein:

the printer is configured to rewrite the ink amount data during an ink consumption process, wherein when ink is substantially used up, the printer is configured to rewrite a part of the ink amount data; and the rewritten part of the ink amount data is configured to be at a non-rewritable protected state.

2. The printing consumable according to claim 1, wherein:

data bits for storing the ink amount data are connected to a write signal line and the write signal line is connected to a control circuit.

3. The printing consumable according to claim 2, wherein:

the control circuit is configured to interfere with the transfer of the write signal to the data bits.

4. The printing consumable according to claim 2, wherein:

the control circuit is configured to interrupt the write signal line.

5. The printing consumable according to claim 1, wherein:

the rewritten part of the ink amount data includes insufficient ink amount identification data or ink remaining amount data.

6. The printing consumable according to claim 1, wherein:

the control circuit includes a switch; and the switch is configured to be in a cutoff state.

7. The printing consumable according to claim 1, wherein:

the control circuit includes an inverter circuit.

8. An ink cartridge, comprising: an ink cartridge main body; and a printing consumable, comprising:

an ink container, detachably installed on the ink cartridge main body; and a first memory, disposed on the ink container, wherein the first memory is capable of being accessed by a printer and stores ink amount data related to an ink status in the ink container; and a control circuit, disposed between the printer and the first memory to interfere with transfer of a write signal from the printer to the first memory, wherein:

the printer is configured to rewrite the ink amount data during an ink consumption process, wherein when ink is used up or nearly used up, the printer is configured to rewrite a part of the ink amount data; and the rewritten part of the ink amount data is configured to be at a non-rewritable protected state.

9. The ink cartridge according to claim 8, further including:

a nozzle circuit, disposed on the ink cartridge main body.

10. The ink cartridge according to claim 9, wherein:

the nozzle circuit includes a third memory for receiving and responding to command signals from the printer.

11. The ink cartridge according to claim 9, wherein the first memory is electrically connected to the nozzle circuit.

12. The ink cartridge according to claim 8, further including:

a second memory, electrically connected to the first memory.

13. The ink cartridge according to claim 12, further including:

at least one portion of data stored in the second memory is different from data in the first memory.

* * * * *